US011826823B1

(12) United States Patent
Nguyen et al.

(10) Patent No.: US 11,826,823 B1
(45) Date of Patent: Nov. 28, 2023

(54) SYSTEM FOR IN-SITU MONITORING FOR ADDITIVE MANUFACTURING USING ULTRASONIC TESTING

(71) Applicant: United States of America as Represented by the Secretary of the Navy, Arlington, VA (US)

(72) Inventors: Charles Nguyen, Rockville, MD (US); Scott Ziv, Gaithersburg, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 244 days.

(21) Appl. No.: 17/390,862

(22) Filed: Jul. 30, 2021

Related U.S. Application Data

(60) Provisional application No. 63/059,794, filed on Jul. 31, 2020.

(51) Int. Cl.
| | |
|---|---|
| *B29C 64/386* | (2017.01) |
| *G01N 29/12* | (2006.01) |
| *B22F 10/28* | (2021.01) |
| *B22F 10/38* | (2021.01) |
| *B23K 9/12* | (2006.01) |
| *B23K 26/342* | (2014.01) |
| *B22F 12/30* | (2021.01) |
| *B33Y 40/00* | (2020.01) |
| *B22F 12/50* | (2021.01) |
| *B22F 12/90* | (2021.01) |
| *B33Y 30/00* | (2015.01) |
| *B22F 12/41* | (2021.01) |

(52) U.S. Cl.
CPC .............. *B22F 10/38* (2021.01); *B22F 12/30* (2021.01); *B22F 12/41* (2021.01); *B22F 12/50* (2021.01); *B22F 12/90* (2021.01); *B23K 9/124* (2013.01); *B23K 26/342* (2015.10); *B33Y 30/00* (2014.12); *B33Y 40/00* (2014.12)

(58) Field of Classification Search
CPC .......... B22F 10/38; B22F 12/50; B22F 12/41; B22F 12/90; B22F 12/30; B33Y 30/00; B33Y 40/00; B23K 26/342; B23K 9/124
USPC .............................................. 266/78, 99, 86
See application file for complete search history.

(56) References Cited

U.S. PATENT DOCUMENTS

| | | | |
|---|---|---|---|
| 10,406,754 B2 | 9/2019 | MacNeish et al. | |
| 10,421,267 B2 | 9/2019 | Reese et al. | |
| 10,562,288 B2 * | 2/2020 | Lavrentyev | .......... B23K 26/702 |
| 10,675,684 B2 * | 6/2020 | DeFelice | ................. B23P 15/00 |
| 10,857,735 B1 * | 12/2020 | Martin | .................... B22F 10/28 |

(Continued)

*Primary Examiner* — Scott R Kastler
*Assistant Examiner* — Michael Aboagye
(74) *Attorney, Agent, or Firm* — Dave Ghatt; Jesus J. Hernandez

(57) ABSTRACT

The invention is a system for the in-situ monitoring of additive manufacturing. The system, without pre-calibration of a test sample, utilizes ultrasonic waves to conduct a layer-by-layer analysis of a three-dimensional component as it is being developed on a build plate. Resonant frequencies for each layer is measured and the difference between the resonant frequencies of consecutive layers are calculated to define a baseline frequency. Similarities or differences in baseline frequencies are used to validate the integrity of the layers of the component, and also to determine if structural inconsistencies exists. Based on these determinations, the system decides whether to continue printing or to halt printing.

2 Claims, 8 Drawing Sheets

(56) References Cited

U.S. PATENT DOCUMENTS

| | | |
|---|---|---|
| 10,960,607 B2 | 3/2021 | Ostroverkhov et al. |
| 10,962,507 B2 | 3/2021 | Gold |
| 2017/0059529 A1* | 3/2017 | Kamel .................... C21D 1/34 |
| 2020/0147691 A1* | 5/2020 | Joshi ..................... B33Y 10/00 |

* cited by examiner

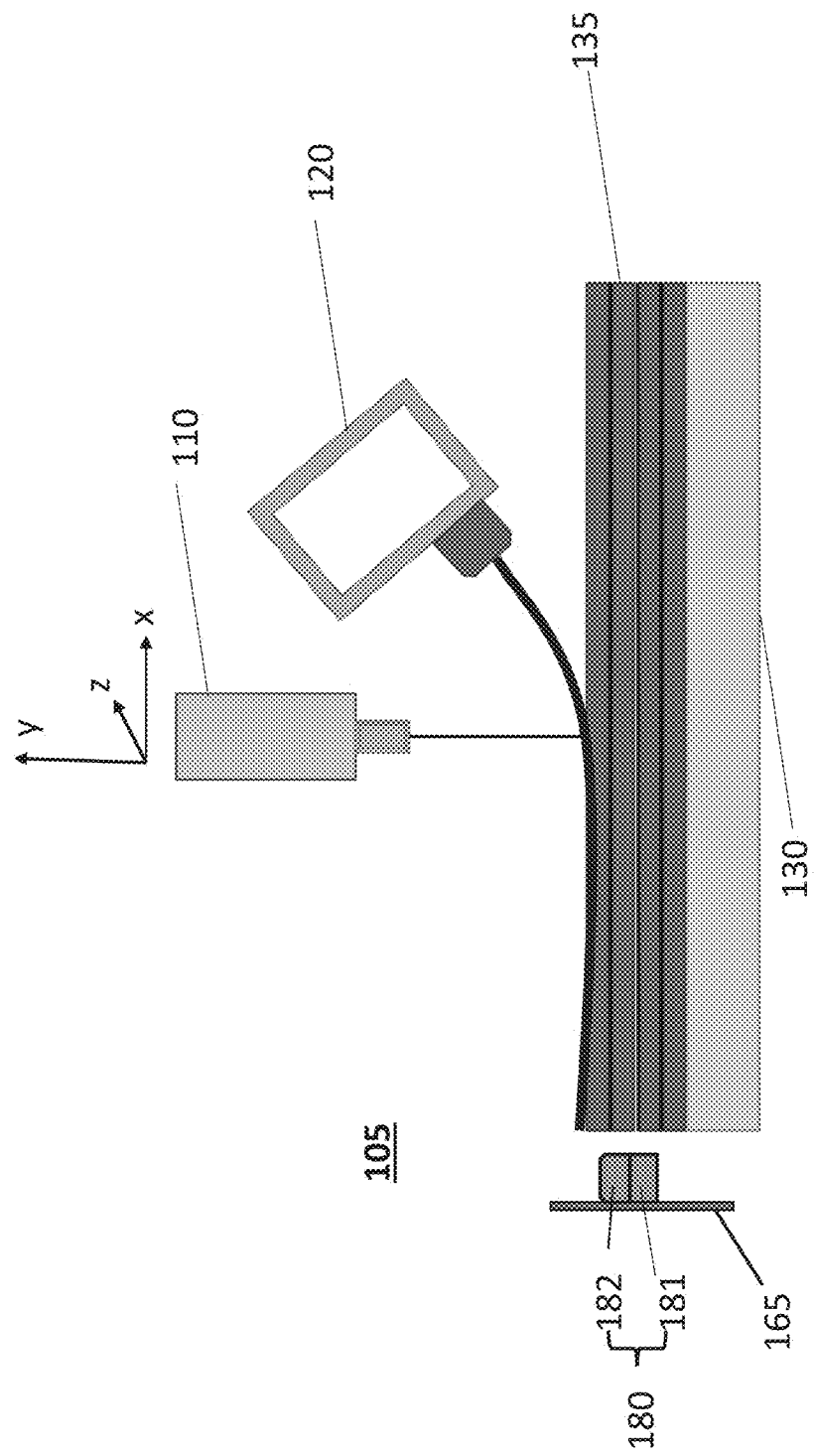

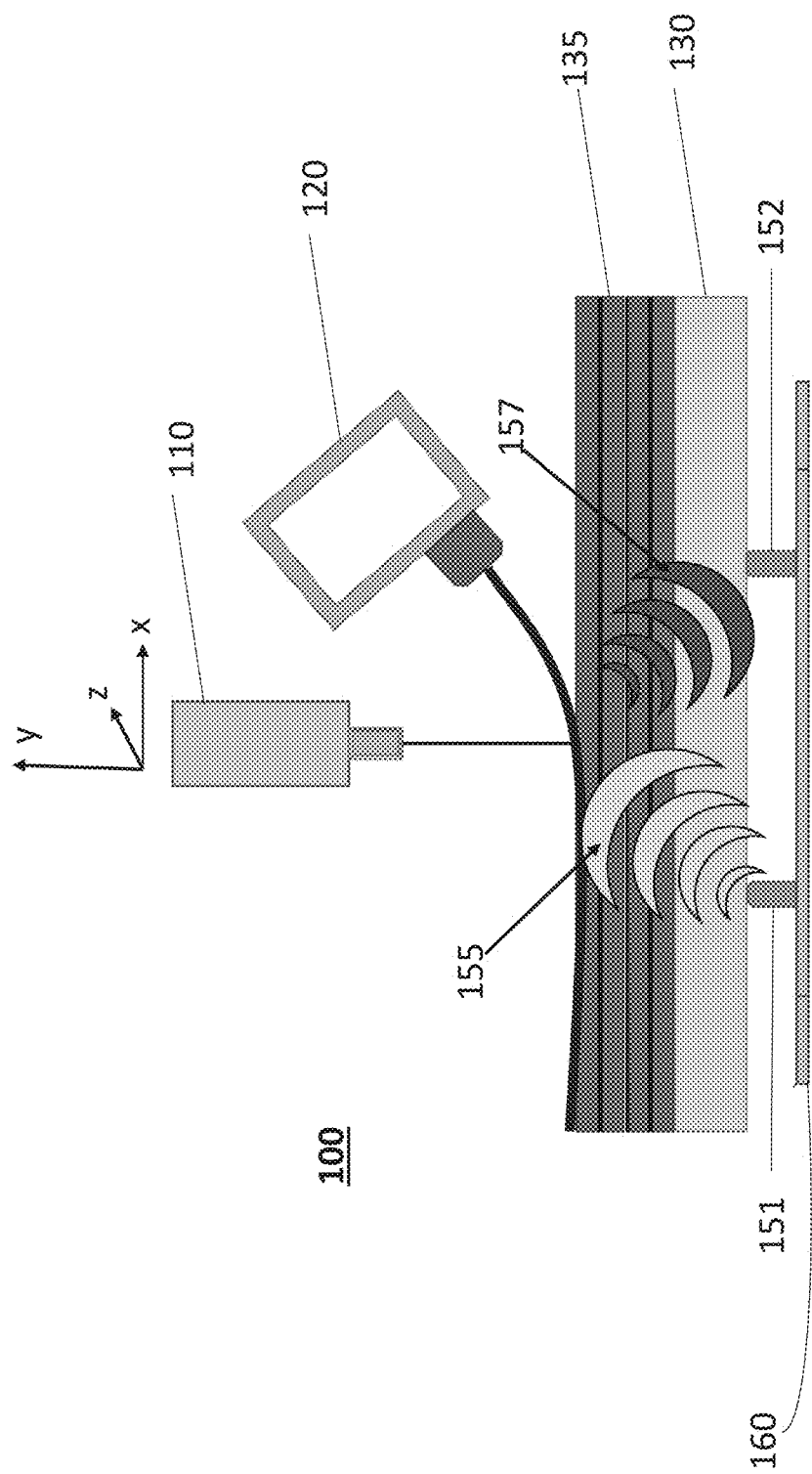

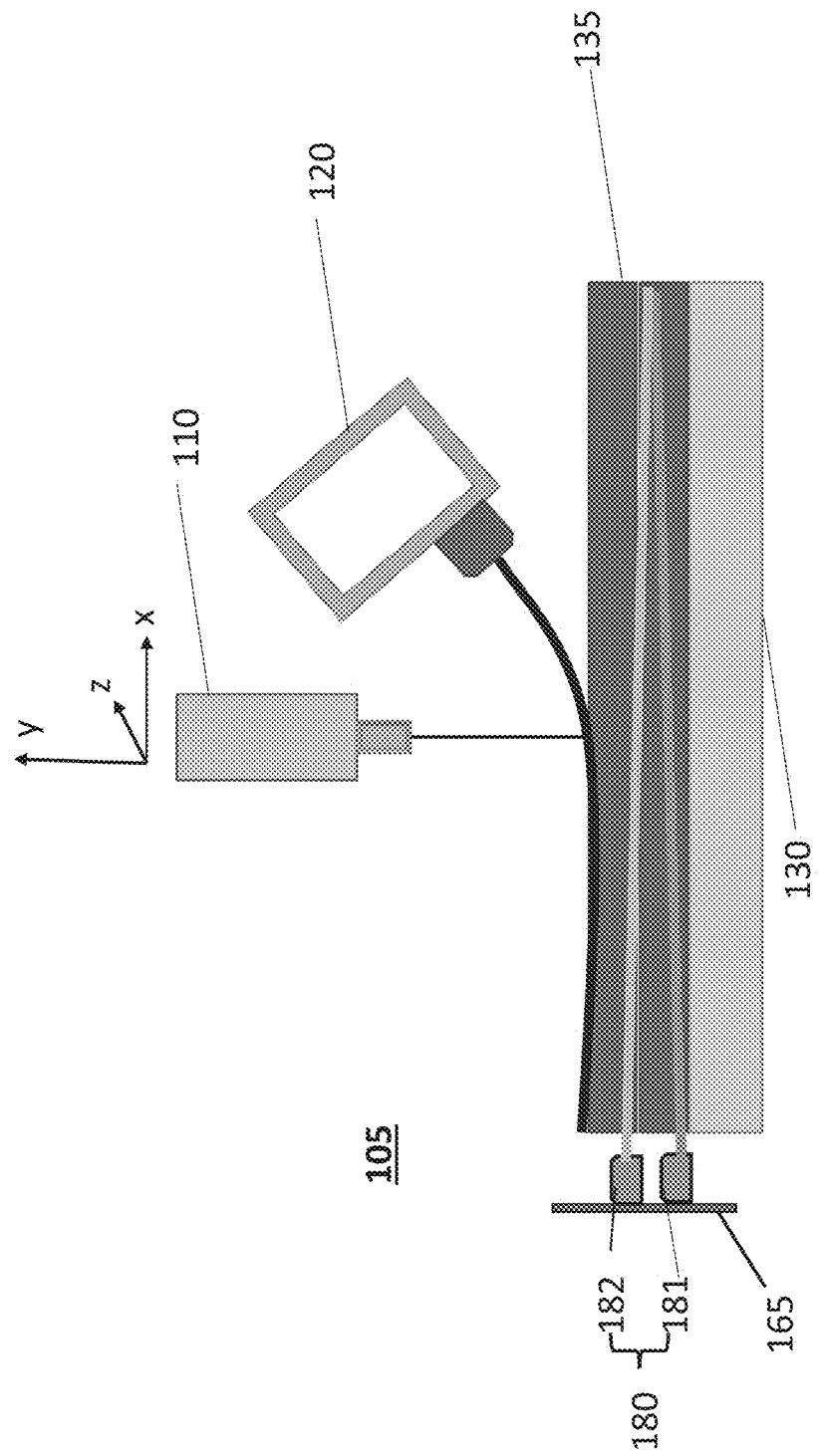

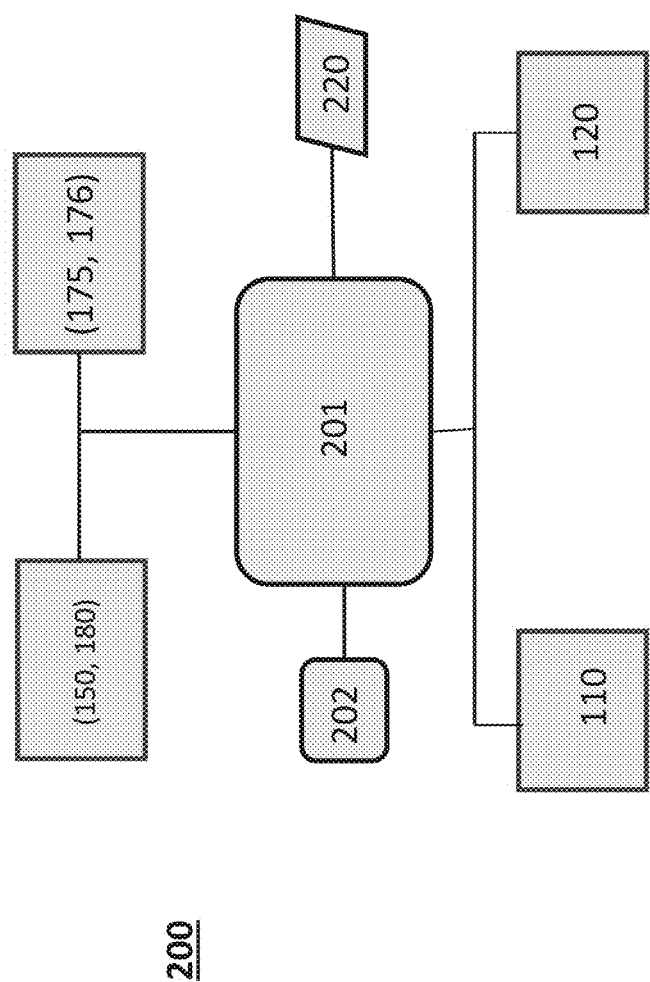

SYSTEM FOR IN-SITU MONITORING FOR ADDITIVE MANUFACTURING USING ULTRASONIC TESTING

CROSS-REFERENCE TO RELATED APPLICATIONS

This application claims the benefit of U.S. Provisional Application No. 63/059,794 filed Jul. 31, 2020, titled "Device for In-Situ Monitoring for Additive Manufacturing using Ultrasonic Testing," incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The invention is directed to a system for the in-situ monitoring of additive manufacturing. In particular, the invention is directed to a system which, without pre-calibration of a test sample, utilizes ultrasonic waves to conduct a layer-by-layer analysis of a three-dimensional component as it is being developed on a build plate. The invention may also be described as being directed to a Concerted Resonance Excitation for Additive Testing and Evaluation (CREATE).

BACKGROUND

Conventional ultrasonic testing methods that rely on the time-domain approach have been found to have difficulty distinguishing indications and discontinuities in advanced materials and processes. Time-domain ultrasonic testing also has challenges in the determination of a material's intrinsic property like modulus. This is even more problematic for materials that have anisotropic behaviors and viscoelastic dependencies. An even more unsurmountable problem arises when attempting to determine if any potential discontinuities could be classified as defect using conventional ultrasonic testing methods, time-domain approaches, for additively manufactured (AM) components.

Conventional ultrasonic testing (UT) is heavily dependent on calibrated reference samples that have the appropriate acoustical properties. Deviations in the required acoustic properties could lead to missing indications/discontinuities that would be deemed as a defect; potentially reducing the inspected parts' life cycle, and even lead to catastrophic failure. Numerous AM calibration samples have been proposed, with various geometric designs and proposed reflectors. However, there are limited works on the qualification of printed calibration samples, causing low confidence if an AM calibrated sample is truly calibrated and can be used.

It has been found that the AM process has high variation from print to print, thus printed calibration samples also have high variation. As seen in the internal microstructures, causing dissimilar acoustical properties from calibration sample to calibration sample; even if multiple calibrations samples are printed with the same processing parameters and geometry are printed. This acoustical variation is problematic, because the conventional time domain ultrasonic testing methods are highly influenced by microstructure. It is extremely challenging to truly understand if a printed calibration sample is actually "calibrated" and can be trusted when used as a calibration for printed components.

U.S. Pat. No. 10,962,507 for example, relies on heavily on pre-calibrations and external-calibrations. U.S. Pat. No. 10,962,507, entitled, "System and Method for Calibrating an Acoustic Monitoring System of an Additive Manufacturing Machine" involves installing a calibration system. This system and method relies heavily on calibrating its sensor and the calibrated reference sample. Associated with this are challenges in developing its sensor and also challenges related to developing reference samples for each apparatus. Based on the issues outlined herein, it is desired to have in-situ monitoring of an additive manufacturing process that does not rely on pre-calibration of sensors and reference samples. It is also desired to have a system of in-situ monitoring of additively manufactured (AM) components, that reduces costs and time, before monitoring even begins, and also during the printing process.

SUMMARY

In one aspect, the invention a system for the in-situ monitoring of additive manufacturing. The system includes, a build supply having a build supply material, and a build plate for receiving the build supply material thereon. The invention also includes a print head for treating the build supply material on the build plate to create solid three-dimensional component, layer-by-layer. In this aspect, the invention includes a sensor arrangement positioned at the build plate. The sensor arrangement includes an ultrasonic pulser for transmitting an ultrasonic wave toward the build plate and/or the three-dimensional component. The sensor arrangement also includes a receiver for receiving the reflected ultrasonic wave. The pulser and receiver are configured to measure the resonant frequencies of each layer of the three-dimensional component, as said each layer is built on the build plate. In this aspect, the invention also includes a control system. The control system includes a system controller for controlling the in-situ monitoring. The system controller is electronically connected to the sensor arrangement, for initiating the issuance of ultrasonic waves, first toward the build plate before any layer is built, and then toward the solid three-dimensional component to measure the resonant frequency of each layer as each layer is built on the build plate. The system controller is electronically connected to the print head, for controlling the operations of the print head including the initiation and halting of printing. The system controller is also connected to the build supply for controlling the supply of build material to the build plate. In this aspect, on a layer-by-layer basis, the difference between the resonant frequencies of consecutive layers are calculated to define a baseline frequency, $D_n$, wherein each calculated baseline frequency, $D_n$ is compared to the next calculated baseline frequency, $D_{n+1}$. This calculation provides a validation of the integrity of every new layer. According to the invention, if the $D_n$ value and the $D_{n+1}$ value matches, the controller determines that this is a "Pass" and printing continues. Alternatively, if there is a difference between the $D_n$ value and the $D_{n+1}$, the controller determines that this is a "Fail" and the controller halts printing operations.

BRIEF DESCRIPTION OF THE DRAWINGS

Other features will be apparent from the description, the drawings, and the claims.

FIG. 1C is an exemplary arrangement for the in-situ monitoring of additive manufacturing using ultrasonic testing, according to an embodiment of the invention.

FIG. 1E is an exemplary illustration, showing the pitching and receiving of the pulser and receiver, according to the embodiment illustrated in FIG. 1A.

FIG. 1F is an exemplary illustration, showing the pitching and receiving of the pulser and receiver, according to the embodiment illustrated in FIG. 1C.

FIG. 2 is an exemplary controller system for the in-situ monitoring of additive manufacturing using ultrasonic testing, according to an embodiment of the invention.

DETAILED DESCRIPTION

Figure 1A:
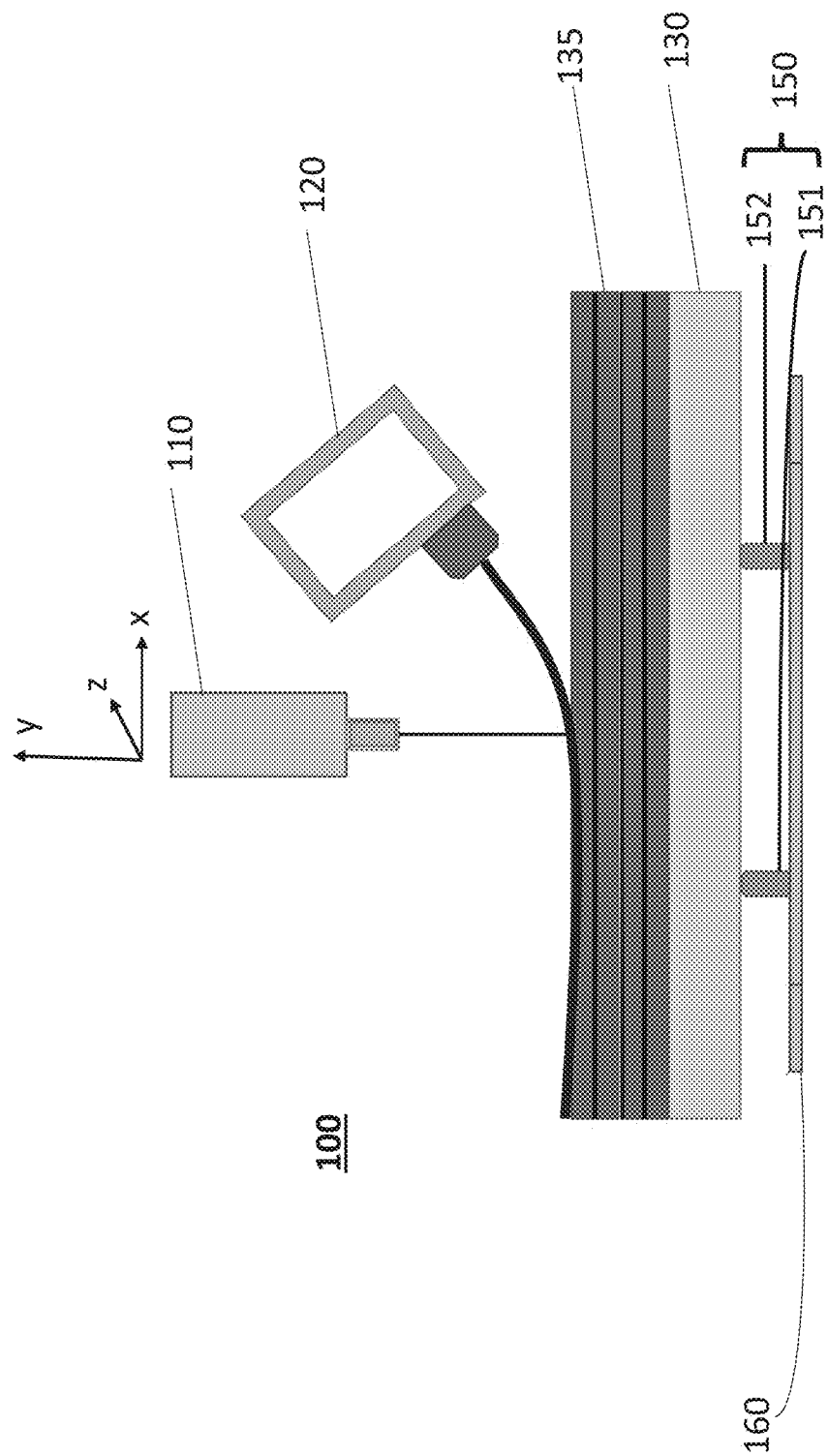
FIG. 1A is an exemplary arrangement for the in-situ monitoring of additive manufacturing using ultrasonic testing, according to an embodiment of the invention.

FIG. 1A is an exemplary arrangement 100 for in-situ monitoring of additive manufacturing using ultrasonic testing, according to an embodiment of the invention. As shown, the arrangement includes additive manufacturing components, including a print head 110, a build supply 120, which may be a container, having build material therein, and a build plate 130. The arrangement also includes a three-dimensional component 135 that is printed layer-by-layer on the build plate 130, as produced by the print head 110 and the build supply 120. The arrangement 100 may be any known additive manufacturing printer having a print head, build supply, and build plate. The print head 110 is moveable in the XYZ directions as shown. The build plate may be stationary or may also be movable the XYZ directions.

According to an embodiment of the invention, the additive manufacturing printer is a powder-fed system, such as Laser Metal Deposition (LMD) and Laser Engineered Net Shaping (LENS). According to this embodiment, the build supply 120 may be a container such as trough, and the build material is a powdered material fed through a nozzle in the trough 120. In operation, the print head 110 generates an energy beam, such as a laser beam or electron beam, to sinter or melt the powdered material. The nozzle may include known shut-off mechanisms, such as a valve, for stopping the feeding of material when desired.

According to another embodiment of the invention, the additive printer is a Laser-based wire-feed system, such as Laser Metal Deposition-wire (LMD-w). According to this embodiment, the build supply 120 is a container that supports a wire reel, with the build material being a wire material. The wire material is fed through an opening in the container 120 onto the build plate 130, where the print head laser melts the wire material. In the instance of a wire-feed system, the laser may incorporate inert gas shielding in either an open environment (gas surrounding the laser), or in a sealed gas enclosure or chamber. The wire may be fed through the container opening via motorized reel, the rotations of which may be stopped when it is desired to stop the feeding of the wire.

FIG. 1A also shows a sensor 150, which is an ultrasonic sensor having a transmitter/pulser 151 for transmitting ultrasonic waves and a receiver 152 for receiving reflected ultrasonic waves. As shown, the sensor 150 is positioned under the build plate 130, and may contact the build plate 130. FIG. 1A shows the sensor elements, the transmitter/pulser 151 and the receiver 152 laterally distanced from each other. This lateral separation may be in the XZ plane. It should be understood that the sensor 150 may also be constructed so that the transmitter 151 and the receiver 152 are next to each other and in a single housing, as opposed to separate laterally spaced-apart elements. FIG. 1E is an exemplary illustration, showing the transmitting and receiving function of the transmitter 151 and the receiver 152, as shown initially in the arrangement of FIG. 1A. The ultrasonic waves transmitted by the transmitter/pulser 151 from below the build plate 130, move upwards through the layers and are reflected back to the receiver 152. This allows the in-situ layer-by-layer examination of the component 135 as it is being built. The received reflected signals corresponds to the waves produced by the component 135.

Figure 1B:
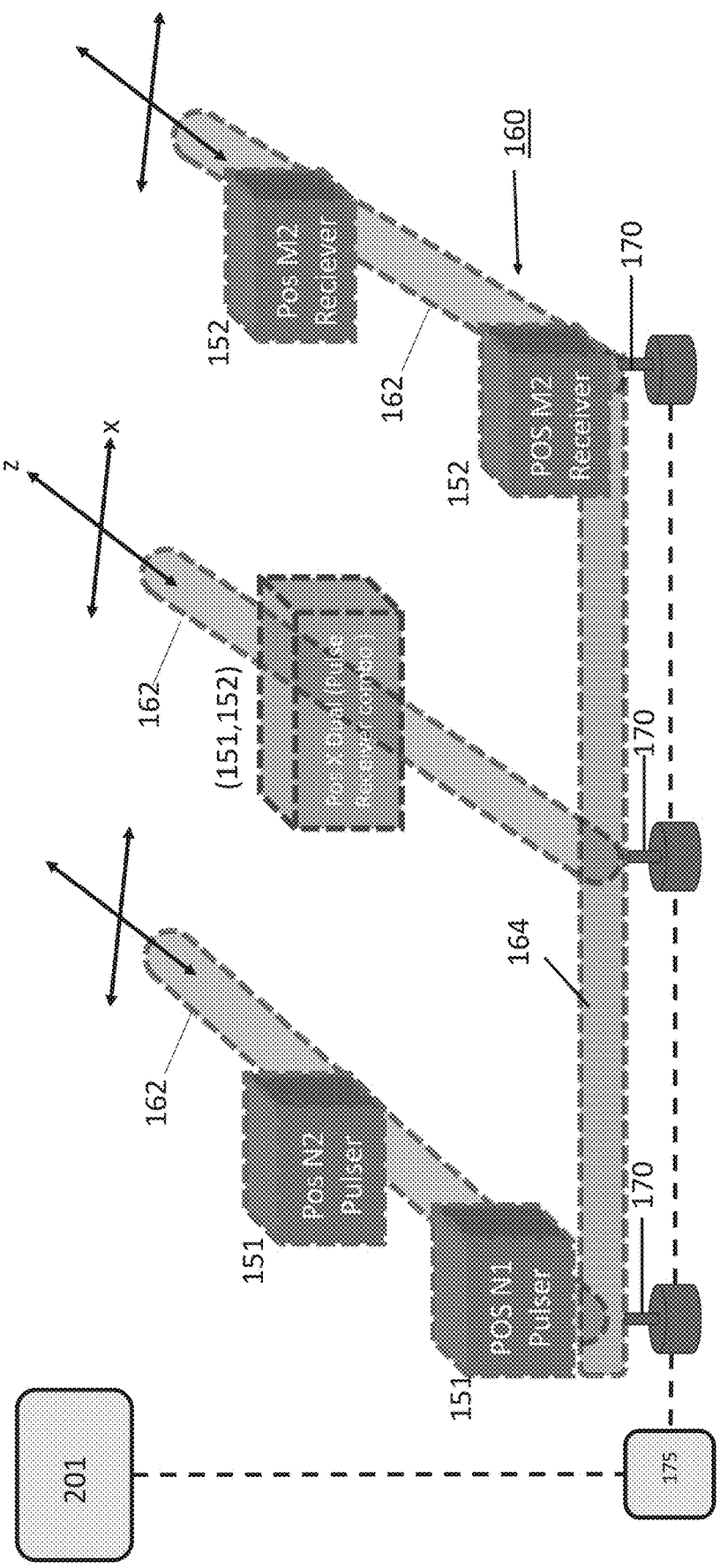
FIG. 1B is an exemplary illustration of the sensor arrangement below the build plate, according to an embodiment of the invention.

FIG. 1B is an exemplary illustration of the sensor arrangement below the build plate 130, according to an embodiment of the invention. As shown, the sensor elements 151 and 152 are mounted on a motorized bar and rail system 160, including a rail 162, along which the sensor elements 151 and 152 may slide in the Z-direction. The system 160 also includes a bar 164 that movably supports the rails 162 for motion in the x direction. This arrangement allows for motion in the XZ-plane.

FIG. 1B shows the transmitter 151 in exemplary positions, Position $N_1$ and Position $N_2$ illustrating that the transmitter 151 is movable anywhere along the rail 162, in the Z-direction. As stated above the rail 162 in movable along the bar 164 in the X-direction. FIG. 1B also shows the receiver 152 in exemplary positions, Position $M_1$ and position $M_2$ illustrating that the receiver 152 is movable anywhere along the rail 162, in the Z-direction. Again, the rail 162 in movable along the bar 164 in the X-direction.

One or more known motors 170, facilitate the movement of the sensor elements 151 and 152 along the rails and bars, via known gearing and relay arrangements. The one or more motors 170 include a motor controller 175 for controlling the motors, including forward/reverse rotations, sequencing or operations etc. As outlined below, the motor controller 175 is electronically connected to the system controller 201, which allows the system controller 201 to move the transmitter 151 and/or the receiver 152 along with, and to match the movement of the print head 110. Moving the transmitter 151 and receiver 152, relative to each other also allows for adjusting the angle at which the ultrasonic waves are pitched and received.

Therefore, according to an embodiment, the transmitter/pulser 151 may be stationary, and the receiver 152 is moved in the XZ-plane to mirror the location of the print head 110, so that for example, the receiver 152 and the print head 110 have identical XZ coordinates, or a predetermined difference of XZ coordinates. According to another embodiment, both the transmitter/pulser 151 and the receiver 152 have a predetermined lateral spacing, and both are moved to maintain this predetermined lateral spacing, and also to match the movement of the print head 110, so that the vertically displaced (in the Y-direction) print head 110 is kept at a midpoint between the transmitter/pulser 151 and the receiver 152.

FIG. 1B also shows an embodiment in which the sensor 150, includes a combined package of transmitter/pulser 151 and receiver 152. Looking at FIG. 1B, this is illustrated in the middle rail 162. As with embodiments in which the sensor elements 151 and 152 are laterally spaced apart and not included in a single package, the single package ultrasonic sensor 150 is movable along the rail 162 and along the bar 164 to accommodate for any position in the XZ-plane under the build plate 130. As outlined above, one or more known motors 170 provide the movement, with controllers 175 and 201 working to control the operation of the one or more motors 170.

FIG. 1C is an exemplary arrangement 105 for in-situ monitoring of additive manufacturing using ultrasonic testing, according to an embodiment of the invention. As with the arrangement 101 of FIG. 1A, the arrangement 105 of FIG. 1C includes a print head 110, a build supply 120, which may be a container, having build material therein, and a build plate 130. The arrangement 105 also includes a three-dimensional component 135 that is printed layer-by-layer on the build plate 130, as produced by the print head 110 and the build supply 120. The arrangement 105 may be any known additive manufacturing printer having a print head, build supply, and build plate. As is known, the print head 110 is moveable in the XYZ directions as shown. The build plate may be stationary or may also be movable the XYZ directions.

It should be understood that the different types of additive manufacturing embodiments outlined with respect to the arrangement 100 in FIG. 1A, is also applicable to the arrangement 105 of FIG. 1C. Therefore, regarding the arrangement 105 of FIG. 1C, the additive manufacturing printer may be a powder-fed system, such as Laser Metal Deposition (LMD) and Laser Engineered Net Shaping (LENS). The additive printer may also be a Laser-based wire-feed system, such as Laser Metal Deposition-wire (LMD-w).

Figure 1D:
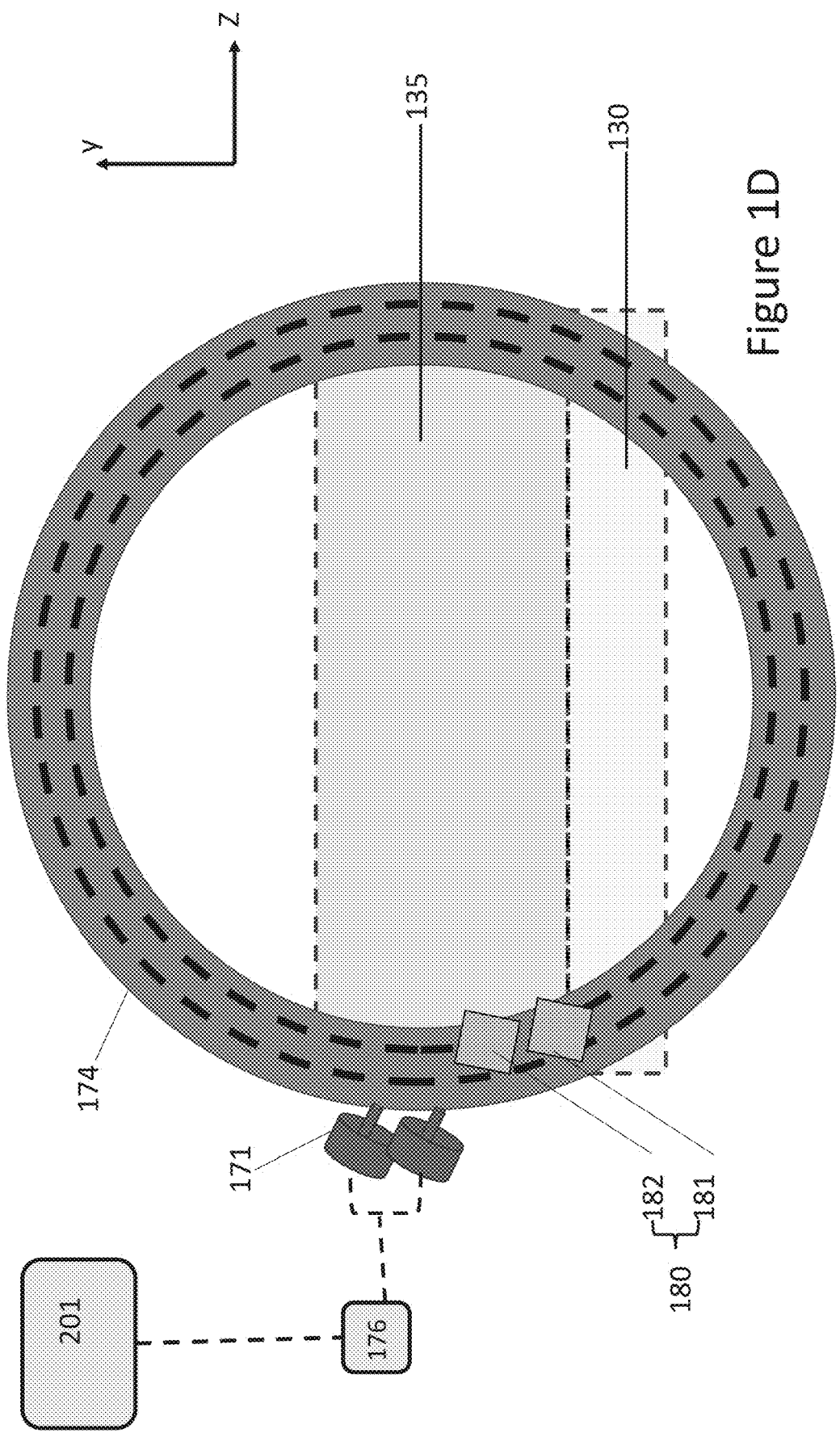
FIG. 1D is an exemplary illustration of the sensor arrangement at a side edge of the build plate, according to an embodiment of the invention.

FIG. 1C also shows a sensor 180, which is an ultrasonic sensor having a transmitter/pulser 181 for transmitting the ultrasonic signals and a receiver 182 for receiving reflected ultrasonic signals. The sensor 180 utilizes laser-ultrasonic technology to enable non-contact ultrasonic measurements. As shown, the sensor 180 is positioned at an edge of the build plate 130 and at an edge of the three-dimensional component 135, Both the transmitter 181 and the receiver 182 are off at a side edge of the build plate 130 and the component 135. Figure if is an exemplary illustration, showing the transmitting and receiving function of the transmitter 181 and the receiver 182, as shown initially in the arrangement of FIG. 1C. FIG. 1D is an exemplary illustration of the sensor arrangement at an edge of the build plate 130 and at an edge of the component 135, according to an embodiment of the invention. As shown, the sensor elements 181 and 182 are mounted on a motorized bar and rail 174, which may be circular, along which the sensor elements 181 and 182 traverse. As both components 181 and 182 traverse the rail 174, they move in the YZ-plane. Movement in the Y-direction allows the transmitter/pulser 181 and the receiver 182 to move upwards to each layer being printed, to perform in-situ analysis, layer-by-layer, as the component 135 is being built. This movement also allows the pulser 181 and receiver 182 to pitch and receive ultrasonic waves at each new layer being printed.

One or more known motors 171, facilitate the movement of the sensor elements 181 and 182 along the rails 174, via known gearing and relay arrangements. The one or more motors 171 include a motor controller 176 for controlling the motors, including forward/reverse rotations, sequencing or operations etc. As outlined below, the motor controller 176 is electronically connected to the system controller 201, which allows the system controller 201 to move the transmitter 181 and/or the receiver 182 to match the movement of the print head 110 and the production of each new layer. Moving the transmitter 181 and receiver 182, relative to each other also allows for adjusting the angle at which the ultrasonic waves are pitched and received.

FIG. 2 is an exemplary controller system 200 for the in-situ monitoring of additive manufacturing using ultrasonic testing, according to an embodiment of the invention. As outlined below, the controller system 200 operates so that pre-calibration of the controller system 200 is not necessary, and is not performed. According to the invention, during in-situ monitoring, actual print passes will be used to calibrate, without the requirement for test samples beforehand. The controller system 200 as illustrated and outlined herein, is applicable to both the arrangement 100 shown in FIGS. 1A and 1B, and the arrangement 105 shown in FIGS. 1C and 1D.

As shown, the controller system 200 includes a system controller 201 electronically attached to different elements of the arrangement 100 to perform the in-situ monitoring outlined below. The electronics of the system controller 201 may include hardware or software that includes firmware, resident software, micro-code or the like. The controller 201 electronics may include a combination of hardware and software. The functions of the controller 201, such as storing frequency data and making baseline frequency calculations (outlined below), may be defined in a computer program, on a platform such as a computer readable storage medium (or media) having computer readable program instructions. The computer readable storage medium may be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the fore going.

As shown in FIG. 2, the controller system 200 includes the controller 201 which is electronically attached to the sensor 150 in one embodiment, and sensor 180 in another embodiment, for moving the sensors elements to desired positions, for initiating the issuance of ultrasonic waves, and for receiving information from the sensor. Regarding the moving the sensors, FIG. 1B shows the structural arrangement for moving the pulser 151 and the receiver 152 of sensor 150 into desired positions beneath the build plate 130 in the XZ-plane. According to an embodiment of the invention, the controller 201 moves the pulser 151 and/or receiver 152 to match the motion of the print head 110. According to another embodiment, the pulser 151 and receiver 152 may be in a fixed location. The positioning of the sensor 150 is accomplished via interaction between the system controller 201 and motor controller 175.

FIG. 1D shows the structural arrangement for moving the pulser 181 and the receiver 182 of sensor 180 into desired positions at an edge of the build plate 130 and an edge of the component 135 in the YZ-plane. As stated above, the sensor 180 utilizes laser-ultrasonic technology to enable non-contact ultrasonic measurements. According to an embodiment of the invention, the controller 201 moves pulser 181 and/or receiver 182 to match the motion of the print head 110. The positioning of the sensor 180 is accomplished via interaction between the system controller 201 and motor controller 176. The motor controllers 175 and 176 may include hardware or software that includes firmware, resident software, microcode or the like.

The controller 201 is also connected to the print head 110 to control the operations of the print head 110, including controlling the movement of the print head as desired in the XYZ coordinate system to execute layer-by-layer building of three-dimensional components. The controller 201 may initiate printing, allow for continued printing, or stop printing, according to for example, user commands, program commands, or determinations based on what is detected by the sensor 150. The controller 201 is also connected to the build supply 120, to control the feeding of build material such as wire material or powdered material, in response to sensor information, program or user commands. FIG. 2 also shows a user interface 220 to allow a user to input commands and to accommodate for user-controlled printing functions, if necessary.

According to an embodiment of the invention, one or more timers 202 associated with the controller 201 allow for the synchronization of activities. Such the synchronization of the feeding of the build material from the supply 120 onto the build plate 130 and printing functions in the print head 110, such as for example, generating an energy beam, a laser beam or an electron beam to treat the build material. By using the associated one or more timers 202, the controller 201 may also synchronize feeding of the build material with the issuance of the ultrasonic elastic waves toward the build material. According to this embodiment, in real time the controller 201 will convert the ultrasonic waves pulsed and received to the frequency domain by for example, Fourier transform, for in-situ monitoring of the resonant modes.

Figure 3:
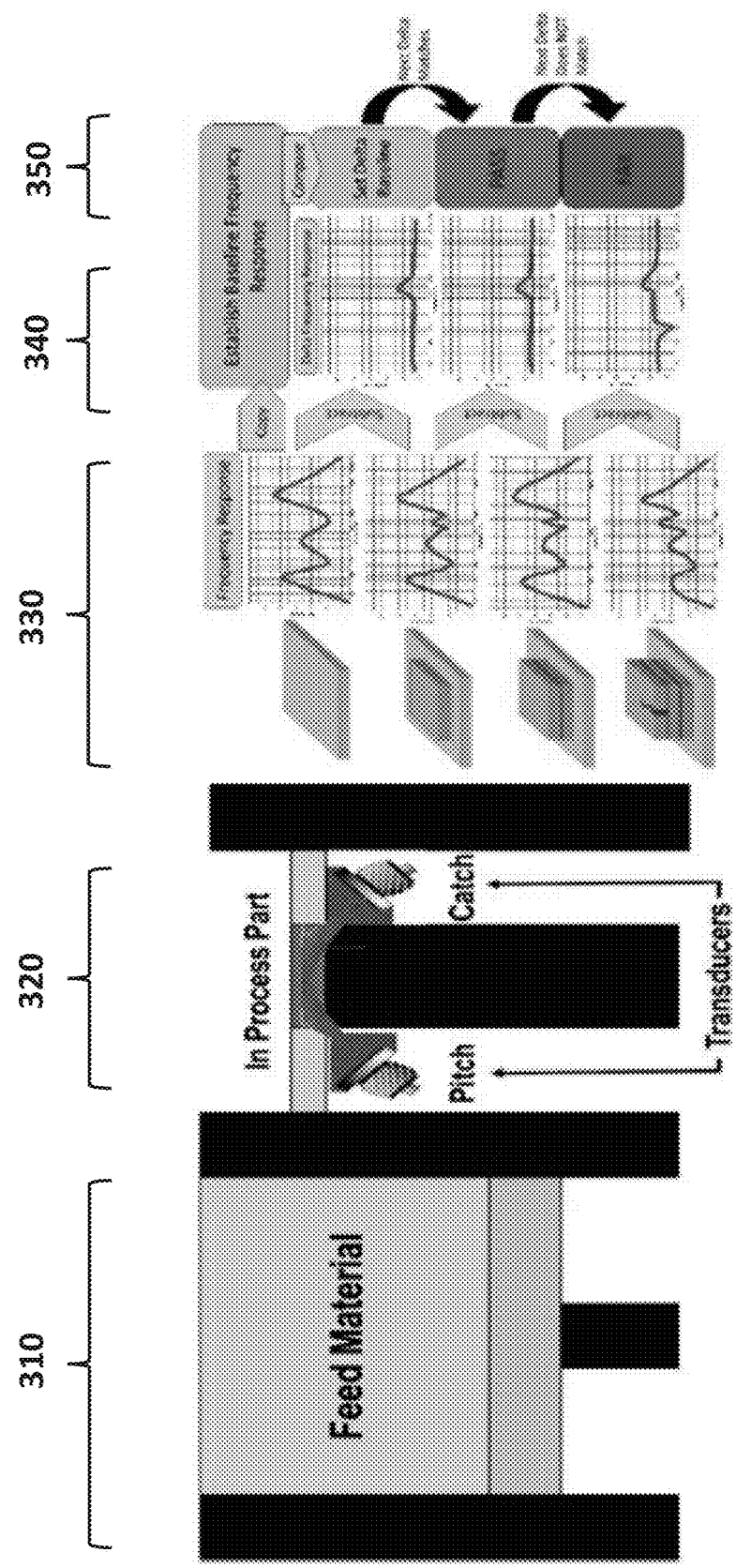
FIG. 3 is an exemplary explanatory illustration of an in-situ monitoring of additive manufacturing using ultrasonic testing process, according to an embodiment of the invention.

FIG. 3 is an exemplary explanatory illustration of an in-situ monitoring of additive manufacturing using ultrasonic testing process, according to an embodiment of the invention. The illustration of FIG. 3 pictorially shows the different stages of the process, and provides a general overview. Moving left to right, FIG. 3 shows stages 310, 320, 330, 340, and 350 which are outlined below, and which are performed without pre-calibration of the of the arrangement 100. It should be understood that stages these as depicted in the pictorial illustration, follow a process for in-situ monitoring, but as the process is continuous, one, two, three, four, or all of these stages may occur simultaneously.

Stage 310 represents the feeding of the build material. As outlined above, the build material may be powdered material or wire-feed, depending on the particular embodiment. The feeding of the build material is controlled by controller 201. For wire-feed embodiments, the controller may initiate a spool/reel or the like to feed the wire onto the build plate 130 or onto the previous layer of build material. For powdered material systems, the controller may open a nozzle or the like to feed the material onto the build plate 130 or unto the previous layer of build material.

As shown in FIG. 3, stage 320 is the printing and in-situ monitoring of the "in process part", a three-dimensional component. Here, the three-dimensional component is printed layer-by-layer. As stated above, the printing functions such as generating energy beams to sinter or melt build materials to produce the component, is controlled by the controller 201.

The monitoring of the three-dimensional component is performed by the sensors 150 and 180, for arrangements 100 and 105, respectively. For arrangement 100 of FIGS. 1A and 1B, the sensor 150 is beneath and in contact with the build plate 130. According to the invention, at the beginning of the build process without pre-calibration values, an initial pitch and receive is performed by the sensors 151 and 152 on the build plate 130 only, just before the first layer of build material is deposited. Then, as the printing/building process continues, the pulser 151 pitches ultrasonic waves through the build plate, to the component, and the receiver 152 receives the reflected signals. The pitch and receive process is shown in FIG. 1E. This task is performed on a layer-by-layer basis as each successive layer is built on the plate 130. As outlined above, the monitoring may also include, controller-based sliding of the sensor elements 151 and 152 in the XZ-plane, so that the elements 151 and 152 follow the print head 110, so that readings are taken at the time of printing. According to an embodiment of the invention, the controller 201 may move the pulser 151 and/or receiver 152 to match the motion of the print head 110.

For arrangement 105 of FIGS. 1C and 1D, the sensor 180 is at a side edge of the build plate 130 and the three-dimensional component 135 as it is constructed. The sensor 180 utilizes laser-ultrasonic technology to enable non-contact ultrasonic measurements from its location at one side/edge of the build plate 130 and the component 135. According to the invention, at the beginning of the build process without pre-calibration values, an initial pitch and receive is performed by sensors 181 and 182 through the build plate 130 only, just before the first layer of build material is deposited. Then, as the printing/building process continues, the pulser 181 pitches ultrasonic waves from the side through the component, and the receiver 182 receives the reflected signals. This task is performed on a layer-by-layer basis as each successive layer is built on the plate 130. As outlined above, the monitoring may also include, controller-based sliding of the sensor elements 181 and 182 in the YZ-plane, so that the elements 181 and 182 follow the print head 110, so that readings are taken at the time of printing, and for each layer as they are built.

At stage 330, the ultrasonic (resonant frequency) data is collected and stored, for each successive layer that is built on the build plate 130. While build material is being deposited via the build supply 120 and melted together by the print head 110, resonant frequencies are collected and stored by the controller 201. The process of collecting data at stage 330 is the same for arrangements 100 and 105. As the printing process begins, the ultrasonic data, i.e., the frequency response, is collected for the build plate 130 before the first layer is printed/built. Then data is collected for successive layers. FIG. 3 shows exemplary plots of frequency responses as a function of time. The pictorial illustration of FIG. 5 shows data collection, up to a third layer of the three-dimensional component, which is a defective layer. In practice, this data is collected for as many layers as necessary (layer-by-layer), either until the entire component is completed, or until a defect is detected, as outlined below.

At stage 340, the controller 201 validates the integrity of the new layer as compared to the previous layer. This is comparison is achieved when the controller 201 performs computations/subtractions for successive layers to establish a baseline frequency response. First, the frequency response collected for the build plate 130 is decoupled from the frequency response for the first layer of build material, to obtain a first baseline frequency or delta, $D_1$. (As outlined above, for both arrangements 100 and 105, the sensors (150, 180) test for frequency responses for the build plate 130 only.) Then, in sequence, the difference between the frequency responses of the first and the second layer is calculated to obtain a second baseline frequency or delta, $D_2$. Next, the difference between the frequency responses of the second and the third layer is calculated to obtain a third baseline frequency value or delta, $D_3$. As stated above, the measurements of resonant frequencies and the calculations of baseline frequencies continue until printing ends.

Stage 350 is a decision-making stage. As shown in FIG. 3, at stage 350, successive baseline frequencies/deltas are compared with each other by the system controller 201. For example the delta $D_1$ for the first layer decoupled from the build plate 130, is compared to the delta $D_2$ between the first and second layers. Then the delta between the first and second layers $D_2$ is compared to the delta $D_3$ between the second and third layers. This calculation continues throughout the printing process, i.e., the difference between one delta $D_n$ and the successive delta $D_{n+1}$.

If there is a match between successive delta values $D_n$ and $D_{n+1}$, then as per the program defined in the controller 201, there is a "Pass" and printing continues. FIG. 3 shows a "Pass" for comparisons between the first and second layers as the delta values match. The "Pass" determination is an in-situ validation of the integrity of consecutive layers of the component being built. Therefore for example, in powder fed systems, if there is a match, the controller 201 ensures that the print head 110 continues to generate an energy beam, such as a laser beam or electron beam, to sinter or melt the powdered material.

If there is a difference between successive delta values $D_n$ and $D_{n+1}$, then as per the program defined in the controller 201, there is a "Fail" and printing is halted. FIG. 3 shows a "Fail" for comparisons between the second and third layers as there is a difference between the delta values as there is a large modal shift from one frequency response to the other. The "Fail" determination is an in-situ determination of inconsistencies in the particular layer, such as discontinuities in the layering due to inconsistent pores, lack of fusion, and key holing, for example. Therefore for example, in powder fed systems, if there is a difference in deltas, the controller 201 stops both the operation of the print head 110, by for example, discontinuing the generation of energy beams. The controller 201 also stops the feeding of build stock to the build plate 130 from the supply 120. This prevents further printing when there are structural inconsistencies. This process provides effective in-situ monitoring without the need to calibrate a sample beforehand, as the process evaluates and inherently calibrates while monitoring layer-by-layer as the component is being printed.

According to another embodiment of the invention, a user may utilize the user interface to adjust the in-situ monitoring. Therefore, during operation a user may redefine a threshold of acceptability, for variations in delta to allow for continued printing. For example, even if there is a difference in delta as outlined in stage 350, which would automatically halt printing, a user may input commands to allow for a desired amount of variations in delta. The instructions defined in the computer program would allow this user-input, and associated operational changes.

The layer-by-layer in-situ monitoring of the solid three-dimensional AM components according to the invention as described throughout this written description, allows for the detection of defects during the build process. The in-situ monitoring additionally serves as a method for validation of the integrity of each layer. Detecting and halting a defective print before completion of a build results in both time and material savings for that build. Providing this capability without pre-calibration also saves time and increases efficiency, and allows for a straightforward retrofit of existing printing systems.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention. The invention including the stated variations is intended to be defined by the following claims and their equivalents, in which all terms are meant in their broadest reasonable sense unless otherwise indicated.

What is claimed:
1. A system for the in-situ monitoring of additive manufacturing, the system comprising:
  a build supply having a build supply material;
  a build plate for receiving the build supply material thereon;
  a print head for treating the build supply material on the build plate to create solid three-dimensional component, layer-by-layer;
  a sensor arrangement positioned at the build plate, comprising an ultrasonic pulser for transmitting an ultrasonic wave toward the build plate and/or the three-dimensional component, and a receiver for receiving the reflected ultrasonic wave, the pulser and receiver configured to measure the resonant frequencies of each layer of the three-dimensional component, as said each layer is built on the build plate;
  a control system, comprising a system controller for controlling the in-situ monitoring, the system controller electronically connected to each of;
    the sensor arrangement for initiating the issuance of ultrasonic waves, first toward the build plate before any layer is built, then toward the solid three-dimensional component to measure the resonant frequency of each layer as each layer is built on the build plate,
    the system controller electronically connected to the print head and controlling operations of the print head including initiation and hafting of printing, and
    the build supply for controlling the supply of build material to the build plate,
    and wherein, on a layer-by-layer basis, a difference between the resonant frequencies of consecutive layers are calculated to define a baseline frequency, $D_n$, and wherein each calculated baseline frequency, $D_n$ is compared to a next calculated baseline frequency, $D_{n+1}$, providing a validation of integrity of every new layer, so that:
      if the $D_n$ value and the $D_{n+1}$ value matches, the controller determines that this is a "Pass" and printing continues, or,
      if there is a difference between the $D_n$ value and the $D_{n+1}$, the controller determines that this is a "Fail" and the controller halts printing operations,
  wherein the sensor arrangement is positioned below and in contact with the build plate, and wherein the system controller is configured to move the pulser and/or the receiver to match the movement of the print head, so that the print head is kept between the pulser and the receiver.

2. A system for the in-situ monitoring of additive manufacturing, the system comprising:
- a build supply having a build supply material;
- a build plate for receiving the build supply material thereon;
- a print head for treating the build supply material on the build plate to create solid three-dimensional component, layer-by-layer;
- a sensor arrangement positioned at the build plate, comprising an ultrasonic pulser for transmitting an ultrasonic wave toward the build plate and/or the three-dimensional component, and a receiver for receiving the reflected ultrasonic wave, the pulser and receiver configured to measure the resonant frequencies of each layer of the three-dimensional component, as said each layer is built on the build plate;
- a control system, comprising a system controller for controlling the in-situ monitoring, the system controller electronically connected to each of;
  - the sensor arrangement for initiating the issuance of ultrasonic waves, first toward the build plate before any layer is built, then toward the solid three-dimensional component to measure the resonant frequency of each layer as each layer is built on the build plate,
  - the system controller electronically connected to the print head and controlling operations of the print head including initiation and halting of printing, and
  - the build supply for controlling the supply of build material to the build plate,
- and wherein, on a layer-by-layer basis, a difference between the resonant frequencies of consecutive layers are calculated to define a baseline frequency, $D_n$, and wherein each calculated baseline frequency, $D_n$ is compared to a next calculated baseline frequency, $D_{n+1}$, providing a validation of integrity of every new layer, so that:
  - if the $D_n$ value and the $D_{n+1}$ value matches, the controller determines that this is a "Pass" and printing continues, or,
  - if there is a difference between the D value and the $D_{n+1}$, the controller determines that this is a "Fail" and the controller halts printing operations,
- wherein the sensor arrangement is positioned at a side edge of the build plate and the three-dimensional component, and wherein the system controller is configured to move the pulser and the receiver to match the movement of the print head, so that the print head is kept between the pulser and the receiver, and to move the pulser and receiver upwards at a level to pitch and receive ultrasonic waves at each new layer being printed.

* * * * *